United States Patent [19]

Baillely et al.

[11] Patent Number: 5,780,410
[45] Date of Patent: Jul. 14, 1998

[54] DETERGENT COMPOSITIONS CONTAINING PERCARBONATE AND MAKING PROCESSES THEREOF

[75] Inventors: Gerard Marcel Baillely, Newcastle upon Tyne, United Kingdom; Paul Amaat Raymond G. France, Bertem; Carole Patricia D. Wilkinson, Brussels, both of Belgium

[73] Assignee: The Procter & Gamble Company, Cincinnati, Ohio

[21] Appl. No.: 581,554

[22] PCT Filed: Jul. 13, 1994

[86] PCT No.: PCT/US94/07877
§ 371 Date: Jan. 16, 1996
§ 102(e) Date: Jan. 16, 1996

[87] PCT Pub. No.: WO95/02724
PCT Pub. Date: Jan. 26, 1995

[30] Foreign Application Priority Data

Jul. 14, 1993 [EP] European Pat. Off. ............ 93870139

[51] Int. Cl.⁶ ............... D06L 3/02; C11D 3/12; C11D 3/39; C11D 3/395
[52] U.S. Cl. ............... 510/220; 252/186.26; 252/186.27; 252/186.42; 252/186.43; 510/224; 510/228; 510/309; 510/310; 510/315; 510/317; 510/375; 510/377; 510/349
[58] Field of Search ............... 252/186.26, 186.27, 252/186.42, 186.43; 510/220, 224, 228, 309, 310, 315, 317, 375, 377, 349

[56] References Cited

U.S. PATENT DOCUMENTS

| | | |
|---|---|---|
| 1,263,258 | 4/1918 | Liebknecht . |
| 2,167,997 | 8/1939 | Reichert . |
| 2,625,514 | 1/1953 | Kirschenbauer . |
| 3,951,838 | 4/1976 | Jayawant et al. . |
| 3,979,318 | 9/1976 | Tokiwa et al. ............ 252/186.22 |
| 4,178,351 | 12/1979 | Klebe et al. . |
| 4,208,295 | 6/1980 | Sai et al. . |
| 4,215,990 | 8/1980 | Barrett, Jr. et al. . |
| 4,316,812 | 2/1982 | Hancock et al. . |
| 4,444,674 | 4/1984 | Gray . |
| 5,149,456 | 9/1992 | Concannon et al. . |
| 5,194,176 | 3/1993 | Copenhafer et al. . |
| 5,374,368 | 12/1994 | Hauschild ............ 510/304 |

FOREIGN PATENT DOCUMENTS

| | | |
|---|---|---|
| 8829 | 3/1980 | European Pat. Off. . |
| 61-69897 | 4/1986 | Japan . |
| WO92/13798 | 8/1992 | WIPO . |

OTHER PUBLICATIONS

"Stabilising Bleach", Manufacturing Chemist and Aerosol News, Nov. 1976, vol. 47, No. 11, London GB, XP002003214, pp. 30, 33 and 36.

Derwent Abstract 54757T–E, for JP 7232200, Aug. 1972.

Derwent Abstract 66384 c/38, for JP 55-102,696, Aug. 1980.

Derwent Abstract 91-284635/39 for JP 3-187,905, Aug. 1991.

Derwent Abstract 91-011087/02 for JP 2-283,800, Nov. 1990.

Derwent Abstract 94-008705/02 for DE 4221736, Jan. 1994.

*Primary Examiner*—Alan Diamond
*Attorney, Agent, or Firm*—Brian M. Bolam; Ian S. Robinson; Kim William Zerby

[57] ABSTRACT

A granular detergent composition comprising an alkali metal percarbonate, characterized in that percarbonate has a mean particle size of from 250 to 900 micrometers, and that said compositions comprise a hydrophobic material, selected from silica, talc, zeolite DAY and hydrotalcit, in a weight ratio of alkali metal percarbonate to hydrophobic material, of from 4:1 to 40:1, preferably 7:1 to 20:1. Both laundry detergent compositions including laundry additives and automatic dishwashing compositions are encompassed by the term "detergent composition" herein. Making processes thereof are also described.

9 Claims, No Drawings

DETERGENT COMPOSITIONS CONTAINING PERCARBONATE AND MAKING PROCESSES THEREOF

This application is a 371 of PCT/US94/07877 filed Jul. 13, 1994, published as WO95/02724 Jan. 26, 1994.

TECHNICAL FIELD

The present invention relates to detergent compositions containing percarbonate bleach, and a hydrophobic material such as hydrophobic silica at narrowly defined ratios to provide optimum bleach stability.

The invention also encompasses processes to make such compositions.

BACKGROUND OF THE INVENTION

The inorganic perhydrate bleach most widely used in laundry detergent compositions is sodium perborate in the form of either the monohydrate or tetrahydrate. However, an increased interest in other perhydrate salts is being observed, of which sodium percarbonate is the most readily available.

Detergent compositions containing sodium percarbonate are known in the art. Sodium percarbonate is an attractive perhydrate for use in detergent compositions because it dissolves readily in water, is weight efficient and, after giving up its available oxygen, provides a useful source of carbonate ions for detergency purposes.

The inclusion of percarbonate salts in laundry detergent compositions has been restricted hitherto by the relative instability of the bleach. In particular, percarbonate salts decompose rapidly when stored in a moist and/or warm atmosphere. It is known that acceptable storage characterisitics may however be obtained through the protection of the carbonate by coating the crystalline product, or by the inclusion of stabilizing agents during its manufacture, or both. A variety of suitable coating agents have been proposed including silicates and mixtures of inorganic sulphate and carbonate salts.

In WO92/06163 are described percarbonate-containing compositions wherein the Equilibrium Relative Humidity as well as the level of heavy metal ion have to be carefully controlled to ensure percarbonate stability.

There is still, however, the need to improve storage stability of the percarbonate bleach, and to achieve this in all types of detergent compositions, including compositions made by the various making processes currently available.

The Applicants have however unexpectedly discovered that when a hydrophobic material selected from silica, talcs or waxes is used into the detergent compositions, in certain ratios to percarbonate particles of a determined size, and particularly when said hydrophobic material such as silica is used as dusting agent onto said percarbonate particles prior to their incorporation into the composition, the storage stability of the percarbonate is remarkably improved, in all types of compositions, including dishwashing compositions adapted for use in automatic dishwashing.

The use of silica as flow aid for detergent granules is known in the art, although the art usually does not distinguish between the different types of silica most advantageous for this purpose; in many cases, the use or precipitated silicas which are mainly hydrophilic, are described.

JP 61 069897, laid open 10th Apr., 1986 states that aluminosilcate, silicon dioxide, bentonite and clay having an average particle diameter of not more than 10 micrometers can be used as a surface modifier at a level of from 0.5% to 35%; Percarbonate is merely mentioned among the bleach ingredients.

SUMMARY OF THE INVENTION

The present invention relates to a granular detergent composition comprising an alkali metal percarbonate, characterized in that percarbonate has a mean particle size of from 250 to 900 micrometers, and that said compositions comprise a hydrophobic material selected from silica, talc, Zeolite DAY and hydrotalcit, in a weight ratio of alkali metal percarbonate to hydrophobic material of from 4:1 to 40:1, preferably 7:1 to 20:1.

Both laundry detergent compositions including laundry additives and automatic dishwashing compositions are encompassed by the term "detergent composition" herein. Making processes thereof are also described.

DETAILED DESCRIPTION OF THE INVENTION

Percarbonate

The laundry detergent or automatic dishwashing compositions herein typically contain from 1to 40%, preferably from 3% to 30% by weight, most preferably from 5% to 25% by weight of an alkali metal percarbonate bleach in the form of particles having a mean size from 250 to 900 micrometers, preferably 500 to 700 micrometers.

Laundry additives typically contain from 20% to 80% of said percarbonate particles.

The alkali metal percarbonate bleach is usually in the form of the sodium salt. Sodium percarbonate is an addition compound having a formula corresponding to $2Na_2CO_3 \cdot 3H_2O_2$, to enhance storage stability the percarbonate bleach can be coated with e.g. a further mixed salt of an alkali metal sulphate and carbonate. Such coatings together with coating processes have previously been described in GB-1,466,799, granted to Interox on 9th Mar. 1977. The weight ratio of the mixed salt coating material to percarbonate lies in the range from 1:2000 to 1:4, more preferably from 1:99 to 1:9, and most preferably from 1:49 to 1:19, preferably, the mixed salt is of sodium sulphate and sodium carbonate which as the genral formula $Na_2SO_4 \cdot n \cdot Na_2CO_3$ wherein n is from 0.1 to 3, preferably n is from 0.3 to 1.0 and most preferably n is from 0.2 to 0.5.

Other suitable coating materials are sodium silicate, of $SiO_2:Na_2O$ ratio from 1.6:1 to 2.8:1, and magnesium silicate.

Commercially available carbonate/sulphate coated percarbonate bleach may include a low level of a heavy metal sequestrant such as EDTA, 1-hydroxyethylidene 1,1-diphosphonic acid (HEDP) or an aminophosphonate, that is incorporated during the manufacturing process.

Preferred heavy metal sequestrants for incorporation as described herein above include the organic phosphonates and amino alkylene poly(alkylene phosphonates) such as the alkali metal ethane 1-hydroxy diphosphonates, the nitrilo trimethylene phsphonates, the ethylene diamine tetra methylene phosphonates and the diethylene triamine penta methylene phosphonates.

Hydrophobic material

The compositions herein further comprise as an essential ingredient a selected hydrophobic material, in a weight ratio with percarbonate of 4:1 to 40:1, preferably 7:1 to 20:1. Said material can be selected from hydrophobic silica, hydrotalcite, and zeolite DAY, and mixtures thereof.

Hydrophobic silica is the preferred material for use herein; silica is a highly dispersed amorphous silicon dioxide. It is commercially available in many forms. Most commonly silica has a tapped density of from 50 g/l to 120 g/l. The specific surface area of the particles ranges from 25 square metres per gram to 800 square metres per gram.

The surface of silica particles can be chemically modified to change their behaviour with respect to water. For example, silica particles may be treated with organosilanes to make the particles predominantly hydrophobic. It has been found that silicas must be hydrophobised to be useful in the present invention.

In commercial practice, silica is usually prepared by one of two techniques: either by precipitation or by high temperature flame hydrolysis. Precipitated silicas generally have an agglomerate size of from 3 micrometers to 100 micrometers, whereas fumed silicas (made by flame hydrolysis) usually have primary particles which are generally spherical and have an average diameter of from 7 nm to 40 nm. Fumed silicas having an average primary particle size of from 7 to 25 nanometers are preferred in the present invention.

Examples of silicas which are particularly useful in the present invention include those supplied by Degussa AG, Frankfurt, Germany under the Trade Name "Aerosil". Aerosil R972 has been found to be particularly useful. This silica is a hydrophobic, fumed silica which has a specific surface area of about 110 square metres per gram and an average primary particle size of 16 nanometers.

Talc is a trioctahedral montmorillonoid, and is described in e.g. "An introduction to clay colloid chemistry", van Olphen, H, page 69.

Talc has the structure : $Mg_3Si_4O_{10}(OH)_2$

Hydrotalcite has the generalised structure:

$M(k+m)N(n+p)(OH)_2A_{zy}-.xH_2O$:

where M is a monolvalent or divalent cation; N is a 3+ or 4+ cation; k, m, n, p are the individual mole fractions of 1+, 2+, 3+, 4+ cations respectively, so k +m+n+p+1 $A_{zy}$– is any anion of charge y– and mole fraction Z; k+2m+3n+4p–zy=0 and x=1 to 100. Hydrotalcites are described in e.g. EP-A-431 867 Specific examples of hydrotalcites have the structure:

Mg6 A12(OH)16CO3.4H2O

Mg4 A12(OH)12Cl2.3H2O

Zn4 A12(OH)12(NO3)2.xH2O

Mg4 A14(OH)y cl.35zH2O y=16–35; z=2–5

Zeolite DAY is supplied under the trade Name "Wessalith" by Degussa. Zeolite DAY has the following structure:

$Na_x[(AlO_2)_z.(SiO_2)y].xH_2O$ wherein x and y are at least about 6, and z is from about 10 to about 264.

In one embodiment of the present invention, the laundry detergent compositions herein also comprise a surface-active agent and a builder.

Surface-active agent

Anionic Surfactants

In the preferred embodiment herein, where the detergent compositions herein is a laundry detergent composition, compositions of the present invention usually contain one or more anionic surfactants as described below.

Alkyl Ester Sulfonate Surfactant

Alkyl Ester sulfonate surfactants hereof include linear esters of $C_8$–$C_{20}$ carboxylic acids (i.e. fatty acids) which are sulfonated with gaseous $SO_3$ according to "The Journal of the American Oil Chemists Society" 52 (1975), pp. 323–329. Suitable starting materials would include natural fatty substances as derived from tallow, palm oil, etc.

The preferred alkyl ester sulfonate surfactant, especially for laundry applications, comprises alkyl ester sulfonate surfactants of the structural formula:

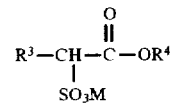

wherein $R^3$ is a $C_8$–$C_{20}$ hydrocarbyl, preferably an alkyl, or combination thereof, $R^4$ is a $C_1$–$C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl, and $R^4$ is methyl, ethyl or isopropyl. Especially preferred are the methyl ester sulfonates wherein $R^3$ is $C_{14}$–$C_{16}$ alkyl.

Alkyl Sulfate Surfactant

Alkyl sulfate surfactants hereof are water soluble salts or acids or the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quarternary ammonium cations derived from alkylamines such as ethylamine, diethylamine, triethylamine, and mixtures thereof, and the like). Typically, alkyl chains of $C_{12-16}$ are preferred for lower wash temperatures (e.g., below about 50° C.) and $C_{16-18}$ alkyl chains are preferred for higher wash temperatures (e.g., above about 50° C.).

Alkyl Alkoxylated Sulfate Surfactant

Alkyl alkoxylated sulfate surfactants hereof are water soluble salts or acids of the formula $RO(A)_mSO_3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulfate, $C_{12}$–$C_{18}E(1.0)M$), $C_{12}$–$C_{18}$ alkyl polyethoxylate (2.25) sulfate, $C_{12}$–$C_{18}E(2.25)M$), $C_{12}$–$C_{18}$ alkyl polyethoxylate (3.0) sulfate $C_{12}$–$C_{18}E(3.0)$, and $C_{12}$–$C_{18}$ alkyl polyethoxylate (4.0) sulfate $C_{12}$–$C_{18}E$ (4.0)M), wherein M is conveniently selected from sodium and potassium.

Other Anionic Surfactants

Other anionic surfactants useful for detersive purposes can also be included in the laundry detergent compositions of the present invention. These can include salts (including, for example. sodium. potassium. ammonium. and substituted ammonium salts such as mono-, di- and triethanolamine salts) of soap. $C_9$–$C_{20}$ linear alkylbenzenesulphonates, $C_8$–$C_{22}$ primary or secondary alkanesulphonates, $C_8$–$C_{24}$ olefinsulphonates. sulphonated polycarboxylic acids prepared by sulphonation of the pyrolyzed product of alkaline earth metal citrates, e.g., as described in British patent specification No. 1.082.179. $C_8$–$C_{24}$ alkylpolyglycolethersulfates (containing up to 10 moles of ehtylene oxide); acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), acyl sarcosinates. sulfates of alkylpolysaccharides such as the sulfates of alkylpolyglucoside (the nonionic nonsulfated compounds being described below). branched primary alkyl sulfates, alkyl polyethoxy carboxylates such as those of the formula $RO(CH_2CH_2O)_kCH_2COO$-M + wherein R is a $C_8$–$C_{22}$ alkyl. k is an integer from 0 to 10. and M is a soluble salt-forming cation. Resin acids and hydrogenated resin acids are also suitable. such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3.929,678. issued Dec. 30. 1975 to Laughlin, et al. at Column 23, line 58 through Column 29, line 23 (herein incorporated by reference).

When included therein, the laundry detergent compositions of the present invention typically comprise from about 1% to about 40%, preferably from about 3% to about 20% by weight of such anionic surfactants. Nonionic Surfactants While any nonionic surfactant may be normally employed in the present invention, two families of nonionics have been found to be particularly useful. These are nonionic surfactants based on alkoxylated (especially ethoxylated) alcohols, and those nonionic surfactants based on amidation products of fatty acid esters and N-alkyl polyhydroxy amine. The amidation products of the esters and the amines are generally referred to herein as polyhydroxy fatty acid amides. Particularly useful in the present invention are mixtures comprising two or more nonionic surfactants wherein at least one nonionic surfactant is selected from each of the groups of alkoxylated alcohols and the polyhydroxy fatty acid amides.

Suitable nonionic surfactants include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Particularly preferred for use in the present invention are nonionic surfactants such as the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred nonionics are the water-soluble condensation products of aliphatic alcohols containing from 8 to 22 carbon atoms, in either straight chain or branched configuration, with an average of up to 25 moles of ethylene oxide per more of alcohol. Particularly preferred are the condensation products of alcohols having an alkyl group containing from about 9 to 15 carbon atoms with from about 2 to 10 moles of ethylene oxide per mole of alcohol; and condensation products of propylene glycol with ethylene oxide. Most preferred are condensation products of alcohols having an alkyl group containing from about 12 to 15 carbon atoms with an average of about 3 moles of ethylene oxide per mole of alcohol.

The nonionic surfactant system can also include a polyhydroxy fatty acid amide component.

Polyhydroxy fatty acid amides may be produced by reacting a fatty acid ester and an N-alkyl polyhydroxy amine. The preferred amine for use in the present invention is N-(R1)-CH2(CH2OH)4-CH2-OH and the preferred ester is a C12–C20 fatty acid methyl ester. Most preferred is the reaction product of N-methyl glucamine with C12–C20 fatty acid methyl ester.

Methods of manufacturing polyhydroxy fatty acid amides have been described in WO 92 6073, published on 16th Apr., 1992. This application describes the preparation of polyhydroxy fatty acid amides in the presence of solvents. In a highly preferred embodiment of the invention N-methyl glucamine is reacted with a C12–C20 methyl ester. It also says that the formulator of granular detergent compositions may find it convenient to run the amidation reaction in the presence of solvents which comprise alkoxylated, especially ethoxylated (EO 3–8) C12–C14 alcohols (page 15, lines 22–27). This directly yields nonionic surfactant systems which are preferred in the present invention, such as those comprising N-methyl glucamide and C12–C14 alcohols with an average of 3 ethoxylate groups per molecule.

Nonionic surfactant systems, and granular detergents made from such systems have been described in WO 92 6160, published on 16th Apr., 1992. This application describes (example 15) a granular detergent composition prepared by fine dispersion mixing in an Eirich RV02 mixer which comprises N-methyl glucamide (10%), nonionic surfactant (10%).

Both of these patent applications describe nonionic surfactant systems together with suitable manufacturing processes for their synthesis, which have been found to be suitable for use in the present invention.

The polyhydroxy fatty acid amide may be present in compositions of the present invention at a level of from 0% to 50% by weight of the detergent component or composition, preferably from 5% to 40% by weight, even more preferably from 10% to 30% by weight.
Other Surfactants The laundry detergent compositions of the present invention may also contain cationic, ampholytic, zwitterionic, and semi-polar surfactants, as well as nonionic surfactants other than those already described herein, including the semipolar nonionic amine oxides described below.

Cationic detersive surfactants suitable for use in the laundry detergent compositions of the present invention are those having one long-chain hydrocarbyl group. Examples of such cationic surfactants include the ammonium surfactants such as alkyldimethylammonium halogenides, and those surfactants having the formula:

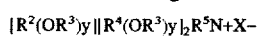

wherein R2 is an alkyl or alkyl benzyl group having from about 8 to about 18 carbon atoms in the alkyl chain, each $R^3$ is selected from the group consisting of —CH$_2$CH$_2$—, —CH$_2$CH(CH$_3$)—, —CH$_2$CH(CH$_2$OH)—, —CH$_2$CH$_2$CH$_2$—, and mixtures thereof; each R$^4$ is selected from the group consisting of C$_1$–C$_4$ alkyl, C$_1$–C$_4$ hydroxyalkyl, benzyl ring structures formed by joining the two R$^4$ groups, —CH$_2$COH-CHOHCOR$^6$CHOHCH$_2$OH wherein R6 is any hexose or hexose polymer having a molecular weight less than about 1000, and hydrogen when y is not 0; R$^5$ is the same as R$^4$ or is an alkyl chain wherein the total number of carbon atoms of R$^2$ plus R$^5$ is not more than about 18; each y is from 0 to about 10 and the sum of the y values is from 0 to about 15; and X is any compatible anion.

Other cationic surfactants useful herein are also described in U.S. Pat. No. 4,228,044, Cambre, issued Oct. 14, 1980, incorporated herein by reference.

When included therein, the laundry detergent compositions of the present invention typically comprise from 0% to about 25%, preferably form about 3% to about 15% by weight of such cationic surfactants.

Ampholytic surfactants are also suitable for use in the laundry detergent compositions of the present invention. These surfactants can be broadly described as aliphatic derivatives of secondary or tertiary amines, or aliphatic derivatives of heterocyclic secondary and tertiary amines in which the aliphatic radical can be straight- or branched chain. One of the aliphatic substituents contains at least 8 carbon atoms, typically from about 8 to about 18 carbon atoms, and at least one contains an anionic water-solubilizing group e.g. carboxy, sulfonate, sulfate. See U.S. Pat. No. 3,929,678 to Laughlin et al., issued Dec. 30, 1975 at column 19, lines 18–35 (herein incorporated by reference) for examples of ampholytic surfactants.

When included therein, the laundry detergent compositions of the present invention typically comprise form 0% to about 15%, preferably from about 1% to about 10% by weight of such ampholytic surfactants.

Zwitterionic surfactants are also suitable for use in laundry detergent compositions. These surfactants can be broadly described as derivatives of secondary and tertiary amines, derivates of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at columns 19, line 38 through column 22, line 48 (herein incorporated by reference) for examples of zwitterionic surfactants.

When included therein, the laundry detergent compositions of the present invention typically comprise form 0% to about 15%, preferably from about 1% to about 10% by weight of such zwitterionic surfactants.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydrocyalkyl groups containing form about 1 to about 3 carbon atoms; water-soluble phosphine oxides containing one alkyl moiety of form about 10 to about 18 carbon atoms and 2 moieties selected form the group consisting of alkyl groups and hydroxyalkyl groups containing from about 1 to about 3 carbon atoms.

Semi-polar nonionic detergent surfactants include the amine oxide surfactants having the formula

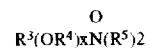

Builder

The compositions herein preferably contain a builder, most preferably non-phosphate detergent builders. These can include, but are not restricted to alkali metal carbonates, bicarbonates, silicates, aluminosilicates, carboxylates and mixtures of any of the foregoing. The builder system is present in an amount of from 25% to 80% by weight of the composition, more preferably from 30% to 60% by weight.

Suitable silicates are those having an SiOhd 2: Nahd 2l O ratio in the range from 1.6 to 3.4, the so-called amorphous silicates of SiO$_2$ : Na$_2$O ratios from 2.0 to 2.8 being preferred.

Within the silicate class, highly preferred materials are crystalline layered sodium silicates of general formula

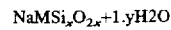

wherein M is sodium or hydrogen, x is a number from 1.9 to 4 and y is a number from 0 to 20. Crystalline layered sodium silicates of this type are disclosed in EP-A-0164514 and methods for their preparation are disclosed in DE-A-3417649 and DE-A-3742043. For the purposes of the present invention, x in the general formula above has a value of 2, 3 or 4 and is preferably 2. More preferably M is sodium and y is 0 and preferred examples of this formula comprise the ., and forms of Na$_2$Si$_2$O$_5$. These materials are available from Hoechst AG FRG as respectively NaSKS-5, NaSKS-7, NaSKS-11 and NaSKS-6. The most preferred material is —Na$_2$Si$_2$O$_5$, NaSKS- 6. Crystalline layered silicates are incorporated either as dry mixed solids, or as solid components of agglomerates with other components.

Whist a range of aluminosilicate ion exchange materials can be used, preferred sodium aluminosilicate zeolites have the unit cell formula

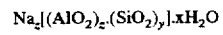

wherein z and y are at least about 6, the molar ratio of z to y is from about 1.0 to about 0.4 and z is from about 10 to about 264. Amorphous hydrated aluminosilicate materials useful herein have the empirical formula

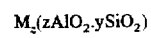

wherein M is sodium, potassium, ammonium or substituted ammonium, z is from about 0.5 to about 2 and y is 1, said material having a magnesium ion exchange capacity of at least about 50 milligram equivalents of CaCO$_3$ hardness per gram of anhydrous aluminosilicate. Hydrated sodium Zeolite A with a particle size of from about 1 to 10 microns is preferred.

The aluminosilicate ion exchange builder materials herein are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size diameter of from about 0.2 micron to about 4 microns. The term "particle size diameter" herein represents the average particle size diameter by weight of a given ion exchange material as determined by conventional analytical techniques such as, for example, microscopic determination utilizing a scanning electron microscope.

Aluminosilicate ion exchange materials useful in the practice of this invention are commercially available. The aluminosilicates useful in this invention can be crystalline or amorphous in structure and can be naturally occurring aluminosilicates or synthetically derived. A method for producing aluminosilicate ion exchange materials is discussed in U.S. Pat. No. 3,985,669, Krummel et al., issued Oct. 12, 1976, incorporated herein by reference. Preferred synthetic crystalline aluminosilicate ion exchange materials useful herein are available under the designations Zeolite A, Zeolite B, Zeolite X, P and MAP, the latter species being described in EPA 384070. In an especially preferred embodiment, the crystalline aluminosilicate ion exchange material is a Zeolite A having the formula $$Na_{12}[(AlO_2)_{12}(SiO2)_{12}] \cdot xH_2O$$

wherein x is from about 20 to about 30, especially about 27 and has a particle size generally less than about 5 microns.

Suitable carboxylate builders containing one carboxy group include lactic acid, glycollic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686 and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829,1, and the 1,2,2-ethane tetracarboxylates, 1,1,3,3-propane tetracarboxylates and 1,1,2,3-propane tetracarboxylates.

Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis, cis, cis-tetracarboxylates, cyclopentadienide pentacarboxylates, 2,3,4,5-tetrahydrofuran-cis,cis,cis-tetracarboxylates, 2,5-tetrahydrofuran-cis-dicarboxylates, 2,2,5,5,-tetrahydrofuran-tetracarboxylates, 1,2,3,4,5,6-hexane hexacarboxylates and carbxoymethyl derivatives of polyhydric alcohols such as sorbitol, mannitol and xylitol. Aromatic polycarboxylates include mellitic acid, pyromellitic acid and the phtalic acid derivates disclosed in British Patent No. 1,425,343.

Of the above, the preferred polycarboxylates are hydroxycarboxylates containing up to three carboxy groups per molecule, more particularly citrates.

The parent acids of the monomeric or oligomeric polycarboxylate chelating agents or mixtures thereof with their salts, e.g. citric acid or citrate/citric acid mixtures are also contemplated as components of builder systems useful in the present invention.

In another embodiment of the invention, are provided Automatic Dishwashing Compositions:

Automatic dishwashing compositions typically contain, in addition to the percarbonate and hydrophobic material of the invention, a builder, such as described above, and a source of alkalinity, such as silicate or carbonate, those ingredients amounting to up to 70% of the formulation. Optional ingredients include polymers and enzymes.

In still another embodiment of the invention, are provided Laundry Additive Compositions: such compositions typically contain in addition to the percarbonate and hydrophobic material of the invention, a builder and a source of alkalinity.

Optional Ingredients

Other ingredients which are known for use in detergent compositions may also be used as optional ingredients in the various embodiments of the present invention, such as bleach activators, other bleaching agents, polymers, enzymes, suds suppressing agents, as well as dyes, fillers, optical brighteners, pH adjusting agents, non builder alkalinity sources, enzyme stability agents, hydrotopes, perfumes.

Bleach activators

The present compositions, especially the laundry detergent compositions/additives, preferably contain from 1% to 20% by weight of the composition, preferably from 2% to 15% by weight, most preferably from 3% to 10% by weight of a peroxyacid bleach activator.

Peroxyacid bleach activators (bleach precursors) as additional bleaching components in accord with the invention can be selected from a wide range of class and are preferably those containing one or more N-or O-acyl groups.

Suitable classes include anhydrides, esters, amides, and acylated derivatives of imidazoles and oximes, and examples of useful materials within these classes are disclosed in GB-A-1586789. The most preferred classes are esters such as are disclosed in GB-A-836 988, 864,798, 1 147 871 and 2 143 231 and amides such as are disclosed in GB-A-855 735 and 1 246 338.

Particularly preferred bleach activator compounds as additional bleaching components in accord with the invention are the N-,N,N' N' tetra acetylated compounds of the formula

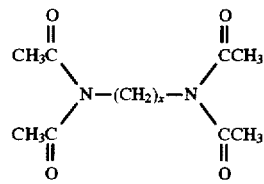

where x can be 0 or an integer between 1 and 6.

Examples include tetra acetyl methylene diamine (TAMD) in which x=1, tetra acetyl ethylene diamine (TAED) in which x=2 and Tetraacetyl hexylene diamine (TAHD) in which x=6. These and analogous compounds are described in GB-A-907 356. The most preferred peroxyacid bleach activator as an additional bleaching component is TAED.

Another preferred class of peroxyacid bleach compounds are the amide substituted compounds of the following general formulae :

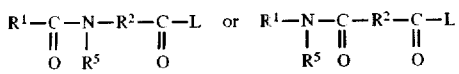

wherein $R^1$ is an aryl or alkaryl group with from about 1 to about 14 carbon atoms, $R^2$ is an alkylene, arylene, and alkarylene group containing from about 1 to about 14 carbon atoms, and $R^5$ is H or an alkyl, aryl, or alkaryl group containing 1 to 10 carbon atoms and L can be essentially any leaving group. $R^1$ preferably contains from about 6 to 12 carbon atoms. $R^2$ preferably contains from about 4 to 8 carbon atoms. $R^1$ may be straight chain or branched alkyl, substituted aryl or alkylaryl containing branching, substitution, or both and may be sourced from either synthetic sources or natural sources including for example, tallow fat. Analogous structural variations are permissible for $R^2$. The substitution can include alkyl, aryl, halogen, nitrogen, sulphur and other typical substituent groups or organic compounds. $R^5$ is preferably H or methyl. $R^1$ and $R^5$ should not contain more than 18 carbon atoms total. Amide substituted bleach activator compounds of this type are described in EP-A-0170386.

In addition to percarbonate, the compositions herein may also contain another bleaching system such as perborate and activator, or a preformed organic peracid or perimidic acid, such as N,N phthaloylaminoperoxy caproic acid, 2-carboxyphtaloylaminoperoxy caproic acid, N,N phthaloylaminoperoxy valeric acid, Nonyl amide of peroxy adipic acid, 1,12 diperoxydodecanedoic acid, Peroxybenzoic acid and ring substituted peroxybenzoic acid, Monoperoxyphtalic acid (magnesium salt, hexhydrate), Diperoxybrassylic acid.

Polymers

Also useful are various organic polymers, some of which also may function as builders to improve detergency. Included among such polymers may be mentioned sodium carboxy-lower alkyl celluloses, sodium lower alkyl celluloses and sodium hydroxy-lower alkyl celluloses, such as sodium carboxymethyl cellulose, sodium methyl cellulose and sodium hydroxypropyl cellulose, polyvinyl alcohols (which often also include some polyvinyl acetate), polyacrylamides, polyacrylates and various copolymers, such as those of maleic and acrylic acids. Molecular weights for such polymers vary widely but most are within the range of 2,000 to 100,000.

Polymeric polycarboxylate builders are set forth in U.S. Pat. No. 3,308,067, Diehl, issued Mar. 7, 1967. Such materials include the water-soluble salts of homo-and copolymers of aliphatic carboxylic acids such as maleic acid, itaconic acid, mesaconic acid, fumaric acid, aconitic acid, citraconic acid and methylenemalonic acid.

Other useful polymers include species known as soil release polymers, such as described in EPA 185 427 and EPA 311 342.

Enzymes

Preferred enzymatic materials include the commercially available amylases, netural and alkaline proteases, lipases, esterases, and cellulases conventionally incorporated into detergent compositions. Suitable enzymes are discussed in U.S. Pat. Nos. 3,519,570 and 3,533,139.

Preferred commercially available protease enzymes include those sold under the tradnames Alcalase and Savinase by Novo Industries A/S (Denmark) and Maxatase by International Bio-Synthetics, Inc. (The Netherlands). Preferred amylases include, for example, -amylases obtained from a special strain of B licheniforms, described in more detail in GB-1,296,839 (Novo). Preferred commercially available amylases include for example, Rapidase, sold by International Bio-Synthetics Inc. and Termamyl, sold by Novo Industries A/S.

A preferred lipase enzyme is manufactured and sold by Novo Industries A/S (Denmark) under the trade name Lipolase and mentioned along with other suitable lipases in EP-A-0258068 (Novo).

Suitable cellulases are described in e.g. WO-92/13057.

Process Details

In one process embodiment herein, the percarbonate particles are coated with the hydrophobic material herein prior to being incorporated with the remainder of the detergent ingredients to form the laundry detergent or automatic dishwashing or laundry additive compositions herein.

The percarbonate particles can optionally be first coated with a water-soluble alkali metal salt, as described above; optionally too, said coated particles can further be sprayed-on with nonionic surfactant, and the hydrophobic material herein then dusted upon, to provide a final coating: This latter step can be conducted in a rotating drum, mixer, or a fluidized bed.

The liquid can be sprayed onto the percarbonate in a low shear mixer or rotating drum; the percarbonate particles are rolled within the drum/mixer in the "wet" state causing them to become sticky. Immediately afterwards, while rotating the drum, the hydrophobic material herein is slowly added to the mixer. The hydrophobic material herein coats the percarbonate and makes the particles free flowing, while protecting the percarbonate against decomposition. The invention can be practiced as a batch or continuous process. Any type of mixer may be found to be suitable for this purpose.

Still another process which is suited to the present invention is that of fluidized-bed spray. In a fluidized-bed spray process, the nonionic is sprayed into a fluidized-bed of percarbonate particles. The solid particles are largely separate from one another in the fluidized-bed, i.e. the fluidized state, and are therefore accessible all round to the spray drops when solution is sprayed into the bed. To obtain a fine distribution of the solution, spraying can be carried out by means of a two component nozzle. Immediately afterwards the hydrophobic material herein can be added in the fluid bed or in a rotating drum/mixer.

In a second embodiment herein, particularly suitable for making laundry detergent compositions, the hydrophobic material herein is added as part of a flow aid at a suitable time of the making process; said addition being prior or subsequent to the addition of the percarbonate to a detergent powder.

The detergent powder herein may be made by many methods which are known to the man skilled in the art including dry-mixing, spray drying and various types of granulation techniques, such as encapsulation, compaction, extrusion, grinding, or combinations of these techniques.

One particularly useful method of granulation is known as agglomeration. The term agglomeration is taken herein to mean the build-up of small particles to form the granular detergent having the required particle size.

Preferably, an additional step consists in spraying some or all of the nonionic surfactant on to detergent granules in one a suitable mixer or rotating drum.

The following steps may be used in a preferred embodiment of the present invention:

i) making a granular detergent powder having a bulk density of at least 650 g/l ;

ii) spraying a nonionic surfactant on to the granular detergent powder of step i);

iii) mixing the product of step ii) with a flow aid which comprises the hydrophobic material herein, wherein the premixed powder is used at a level of from 3% to 15% by weight of the finished detergent composition.

The granular detergent powder in step i) is preferably made by agglomeration of detergent pastes, most preferably using a process of fine dispersion mixing or granulation. Even more preferably the detergent agglomerates are then dry mixed with other optional ingredients.

The process is described in more details in the Applicant's co-pending European Patent application no. 92870138.2.

Step iii) above can be conducted with any suitable means, such as rotating drums or lower shear mixers, the flow aid compositions preferably of ploughshare type.

Ploughshare mixers are available from e.g. Lodige Machinebau GmbH, Paderborn Germany, and Drain Werke GmbH, Mannheim Germany.

The flow aid contains from 0.5% to 30% of hydrophobic material preferably silica. The rest of the flow aid is typically aluminosilicate such as described above, the crystalline species being preferred, and especially partially hydrated forms of aluminosilicates, with up to 15% hydration level, being suitable.

EXAMPLES

In these examples the following abbreviations have been used:

C45AS Sodium $C_{14}$–$C_{15}$ alkyl sulfate

C35AE3S $C_{13}$–$C_{15}$ alkyl ethersulfate containing an average of three ethoxy groups per mole CMC: Sodium carboxymethyl cellulose C25E3A $C_{12-15}$ primary alcohol condensed with an average of 3 moles of ethylene oxide TAED Tetraacetyl ethylene diamine

Example I

The following granular laundry detergent composition was prepared

|  | % by weight |
|---|---|
| Anionic surfactant agglomerate* | 30 |
| Layered silicate compacted granule (supplied by Hoechst under trade name SKS-6) | 18 |
| Percarbonate** | 25 |
| TAED agglomerate | 9 |
| Suds suppressor agglomerate | 2 |
| Perfume encapsulate | 0.2 |
| Granular dense soda ash | 8.5 |
| Granular acrylic-maleic copolymer | 3.0 |
| Enzymes | 3.5 |
| Granular soil release polymer | 0.5 |

Anionic surfactant agglomerates were made from a 78% active surfactant paste which comprises C45AS/C35AE3S in the ratio of 80:20. The paste was agglomerated with a powder mixture according to the process described in EPA510746. The resulting anionic surfactant granule had a composition of 30% C45AS, 7.5% C35AE3S, 24% zeolite, 20% carbonate, 2.5% CMC, 12% acrylic-maleic co-polymer, and the balance of moisture.

Percarbonate coated with 2.5% carbonate/sulphate with mean particle size of 500 microns.

The mixture of granular ingredients listed above was placed inside a 140 litre rotating drum that operates at 25 rpm. While operating the drum a mixture of nonionic surfactant (C25E3) and a 20% aqueous solution of optical brightener at ratios of 14:1 were sprayed onto the granular mixture to a level of 7% by weight of the granular components. The spraying time was about 1–2 minutes. Immediately afterwards, perfume was sprayed on, at a level of, 0.5% by weight of the granular components, while rotating the drum. Then, without stopping the rotation of the drum, a flow aid was slowly added to the mixer, taking about 30 seconds. The level and type of flow aids used is given below in Table 1. Once the addition of flow aid was finished, the mixer was allowed to rotate for about 1 minute and was then stopped. The finished product was then removed from the rotating drum.

The following flow aids were prepared using Zeolite A and hydrophobic silica Aerosil R792 (Trade name) both supplied by Degussa. Mixtures were prepared in a Lodige FM130 (Trade name) by operating at 165 rpm for 0.5 minutes.

TABLE 1

| Flow aids | Level (%) on Finished Products | |
|---|---|---|
| 100% Zeolite | 10% | Reference Composition A |
| 90% Zeolite + 10% Hydrophobic Silica | 10% | Example 1 |

The compositions were stored at 35° C./80% Equilibrium Relative Humidity (eRH) in cartonboard boxes. The % percarbonate recovery was measured

| Storage conditions | Reference Composition A | Example 1 |
|---|---|---|
| 2 weeks 35° C./80% eRH | 71 | 80 |
| 3 weeks 35° C./80% eRH | 65 | 75 |
| 4 weeks 35° C./80% eRH | 54 | 66 |

What is claimed is:

1. A granulated detergent composition comprising an alkali metal percarbonate, wherein said percarbonate has a mean particle size of from 250 to 900 micrometers, and that said composition comprises a hydrophobic material, selected from hydrophobic silica, talc, zeolite DAY and hydrotalcit, in a weight ratio of alkali metal percarbonate to hydrophobic material of from 4:1 to 40:1 wherein said percarbonate particles are coated with a first coat of a water soluble alkali metal salt, wherein further said percarbonate particles are coated with a nonionic surfactant after coating with said first coat and said hydrophobic material is present as a final coat on said nonionic surfactant.

2. A composition in accordance with claim 1 where said hydrophobic material is hydrophobic silica.

3. A composition in accordance with claim 2 wherein the weight ratio of alkali metal percarbonate to hydrophobic silica is from 7:1 to 20:1.

4. A composition in accordance with claim 2 wherein the hydrophobic silica is a fumed silica having an average primary particle size of from 7 to 25 nanometers.

5. A composition in accordance with claim 1 which is a laundry detergent composition containing a surface-active agent, and a builder, and has a bulk density of at least 650 g/l.

6. A composition in accordance with claim 1, which is an automatic dishwashing composition containing a builder.

7. A composition in accordance with claim 1 which is a laundry detergent additive containing from 20 to 80% by weight of the percarbonate.

8. A process for making the granular detergent composition according to claim 1 which comprises the steps of i) spraying onto the percarbonate particles a nonionic surfactant wherein the percarbonate particles have been pre-coated with a water-soluble alkali metal salt, and ii) coating the product of step i) with the hydrophobic material.

9. A process according to claim 8 wherein said hydrophobic material is hydrophobic silica.

* * * * *